United States Patent [19]

Snith et al.

[11] Patent Number: 4,856,057
[45] Date of Patent: Aug. 8, 1989

[54] APPARATUS IN A LOUDSPEAKING TELEPHONE SET FOR SUPPLYING POWER TO AN AMPLIFIER CONNECTED TO THE LOUDSPEAKER

[75] Inventors: Lars A. Snith, Kista; Bengt O. Berg, Solna, both of Sweden

[73] Assignee: Telefonaktiebolaget L M Ericsson, Stockholm, Sweden

[21] Appl. No.: 209,623
[22] PCT Filed: Dec. 8, 1987
[86] PCT No.: PCT/SE87/00582
  § 371 Date: Jun. 21, 1988
  § 102(e) Date: Jun. 21, 1988
[87] PCT Pub. No.: WO88/04502
  PCT Pub. Date: Jun. 16, 1988

[30] Foreign Application Priority Data
  Dec. 9, 1986 [SE] Sweden .................. 8605276

[51] Int. Cl.$^4$ .............................. H04M 1/60
[52] U.S. Cl. ..................... 379/388; 379/413
[58] Field of Search ........... 379/388, 389, 390, 395, 379/387, 413, 420

[56] References Cited

U.S. PATENT DOCUMENTS 4,319,094 3/1982 Naganawa ................ 379/387
4,376,876 3/1983 Versteeg et al. .......... 379/388 X

OTHER PUBLICATIONS

"All Telephone Functions in One Chip, PBL3780" by Bengt Berg in *Ericsson Review*, No. 3, 1985.
"All-Electronic Telephone Set With Low-Voltage Operating Circuit and Piezoelectric Transducers" by M. Yoshitoshi, Y. Ichinose and T. Naganawa.

Primary Examiner—James L. Dwyer
Attorney, Agent, or Firm—Burns, Doane, Swecker & Mathis

[57] ABSTRACT

The invention relates to an apparatus for powering a loudspeaker amplifier (5) in a telephone set fed with a line current (ILO) from a telephone line (3). An incoming speech signal (S) is amplified (8) and sent to a loudspeaker (4) via the amplifier (5), which is powered via its feed connections (19, 20) from a reservoir capacitor (6). By the capacitor feed there are avoided variations in the line current (ILO) on amplification of the speech signal (S). The capacitor is recharged with the aid of the speech circuit (13), which has an amplifier means (16, 17) sensing a line voltage (UO) via a voltage sensing circuit (18). The amplifier means (16, 17) steers the line current (ILO) to a constant value responsive to the line voltage (UO) by sending a current (16) to the line (3) via a resistor (R1), thus keeping constant a current (14) through the resistor (R1), this current being sensed by the amplifier means. The reservoir capacitor (6) is connected via a controllable current generator (22) to the resistor (R1) and a circuit (24), which senses the voltage across the resistor (R1) and controls the generator (22). The reservoir capacitor (6) is charged by a current (15) through the current generator (22) and the amplifier means (16, 17) controls its output current (16) such that the current (14=15+16) through the resistor (R1) is kept constant. The apparatus utilizes the existing speech circuit (13) to keep the line current (ILO) constant at the power supply.

5 Claims, 2 Drawing Sheets

APPARATUS IN A LOUDSPEAKING TELEPHONE SET FOR SUPPLYING POWER TO AN AMPLIFIER CONNECTED TO THE LOUDSPEAKER

TECHNICAL FIELD

The invention relates to an apparatus in a loudspeaking telephone set for supplying power to an amplifier connected to the loudspeaker, said telephone set being DC fed by a line current via its subscriber line and provided with a speech circuit having electronic semiconductor circuits, the receiver and microphone of the set being connected to the speech circuit, which also has a voltage sensing circuit connected to the subscriber line for sensing a line voltage across it, as well as an amplifier means connected via a first impedance to the subscriber line for maintaining a current through the first impedance at a constant value responsive to the line voltage.

BACKGROUND ART

In the transmission of speech signals in a telephone network between an exchange and a telephone set, it is a known problem that a varying line current causes distorsion of the transmitted speech signal. The line current, which is a direct current, is therefore kept at a constant level by electrical circuits included in the speech circuit of the telephone set, e.g. as illustrated in an article "Alla telefonens functioner i ett chip, PL3780" by Bengt Berg in "Ericsson Review", No 3, 1985, pp 138–143. For the transmission of speech signals over long telephone lines with low line current there have been developed feed circuits, e.g. for the receiver in a telephone set, which enable the speech signal to be transmitted without distortion. Such a circuit has been described, e.g. in IEEE, Vol. CE-28, No 3, 22. August 1982, M. Yoshitoshi et al, "All-electric Telephone Set with Low-Voltage Operating Circuit and Piezoelectric Transducers", and in the U.S. Pat. No. 4,319,094 cited in this article. According to this patent, a constant portion of the line current is taken off to charge a constant voltage circuit. The energy from this circuit is utilized when the speech signal has a large amplitude and can be distorted due to the line voltage being low. The apparatus is relatively complicated and has the drawback that it continuously takes off the contant portion of the line current, ever when the constant voltage circuit is fully charged.

DISCLOSURE OF THE INVENTION

The above-mentioned drawbacks are avoided with an apparatus according to the invention, that utilizes existing circuits in a telephone set and takes the line current to a reservoir capacitor only during short time intervals. The apparatus is distinguished by the disclosures of the accompanying claims.

BRIEF DESCRIPTION OF DRAWINGS

An example of an embodiment of the invention will now be described in more detail below, and with reference to a drawing, on which FIG. 1 schematically illustrates a part of a telephone system.

BEST MODE FOR CARRYING OUT THE INVENTION

Figure 1:
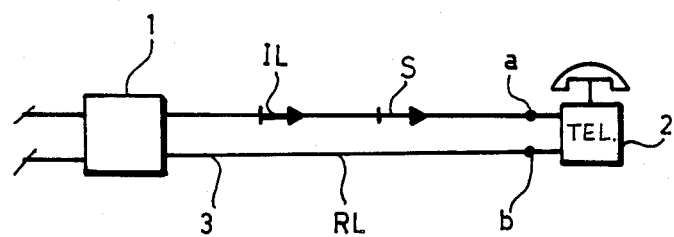
Figure 2:
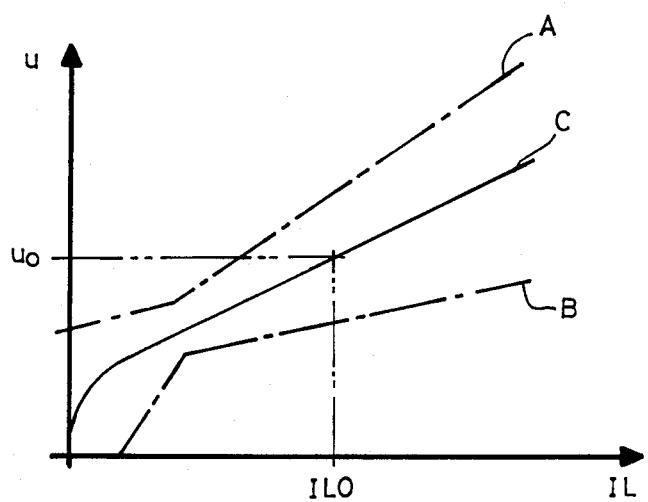
FIG. 2 shows a graph of line current and voltage for this telephone system and FIG. 3 is a part of a circuit diagram for a telephone set.

In FIG. 1 there is schematically illustrated a telephone exchange 1 and a subscriber telephone 2, which has line connections a and b for a subscriber line 3, connecting the set 2 to the exchange 1. During a call the set 2 is powered by DC line current IL and a line voltage U is maintained between the line connections a and b. The relationship between line current IL and voltage U is illustrated in the graph of FIG. 2. Different telephone administrations have requirements that the line voltage U and associated current IL shall lie within a given area on the graph, e.g. that bounded by two lines A and B. These requirements are set up to ensure that different functions in the exchange 1 can be performed with great reliability. In a given telephone system there is selected a well-defined relationship between line voltage U and current IL, e.g. according to the curve C in FIG. 2. For a given subscriber, where the subscriber line 3 has a definite line resistance RL, the line current has a value ILO and the line voltage a corresponding value UO, as indicated in the Figure. It is essential for the sound quality in speech transmission that the constant value of the line current is maintained. A speech signal S, which is transmitted during a call on the line 3, is an alternating signal, and if the line current ILO varies, this variation will be superposed on the speech signal S, thus causing noise in it. In telephone apparatuses provided with loudspeakers and which are powered via their subscriber lines this disturbance of the speech signal S can be very noticeable, since the loudspeaker uses relatively large power during short periods of time. The present invention relates to an apparatus with the aid of which the problem of keeping the line current constant is solved in a simple way, as will be described below.

Figure 3:
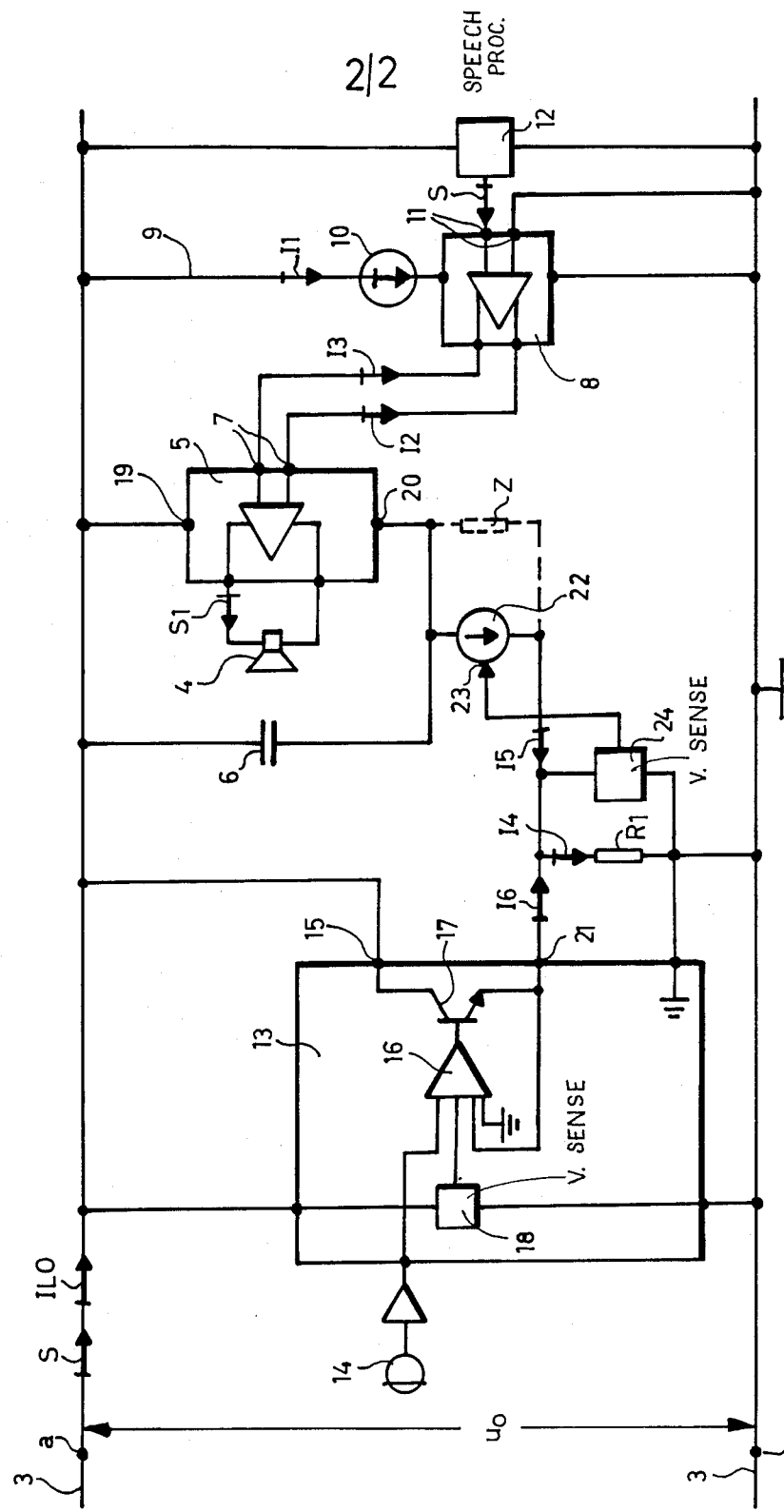

A circuit diagram is illustrated in FIG. 3 for the circuits in the telephone set 2, where parts of the circuit of less essential importance to the invention have only been schematically shown. A more complete circuit daigram for a telephone set is to be found in the previously mentioned article in "Ericsson Review" No 3, 1985. The telephone set 2 is equipped with a loudspeaker 4 for translating the received speech signals S. The loudspeaker is connected to an amplifier 5, which is powered from the telephone line with the aid of an inventive apparatus having a reservoir capacitor 6. This apparatus will be described in more detail hereinafter. The amplifier has a signal input 7 connected to a pre amplifier 8. The latter is powered from the line 3 via connection leads 9 and takes off a feed current I1 via a current generator 10. This feed current is substantially constant, and is only a small portion, less than 5%, of the the line current ILO to the telephone set 2. The preamplifier 8 has a signal input 11 connected to a not more closely illustrated circuit 12, in which the received speech signal S is processed. The pre-amplifier 8 receives the signal S from the circuit 12, amplifies it and converts it into two currents I2 and I3 such that the difference between these two I2–I3, corresponds to the speech signal S. The sum of the currents I2 and I3 is constant, so that the power consumption of the pre-amplifiers is substantially constant, as already mentioned. The loudspeaker amplifier 5 receives the currents I2 and I3, and sends an amplified signal S1 corresponding to the speech signal S to the loudspeaker 4.

For speech transmission via the handset receiver the telephone set 2 has a speech circuit 13 connected to a microphone 14 and a not illustrated receiver in its hand set. The speech circuit 13 also has a connection 15 to the line connection a, and a connection 21 via an impedance to the line connection b, the impedance being in this embodiment a resistor R1. The speech circuit 13 has an amplifier means 16 with an output connected to a transistor 17, which has its collector connected to the connection 15 and its emitter to the connection 21. The speech circuit has a voltage sensing circuit 18 connected to the line connections a and b for sensing the line voltage UO. The circuit 18 is also connected to the amplifier means 16, to which it sends its signal corresponding to the line voltage UO. The voltage across the resistor R1 is sensed by the amplifier means 16, which sends a current 16 so that a current I4 through the resistor R1 is kept at a constant value responsive to the line voltage UO. The situation here is that the current 16 is substantially just as great as the current I4 during the major part of a call, as will be explained hereinafter. Apart from the current I4, the telephone set 2 takes off a further substantially constant current, which includes the already mentioned constant current I1 to the pre-amplifier 8. The sum of the current I4 and this further current constitutes the line current ILO. With the aid of the above-described apparatus in the speech circuit 13 for controlling the current I4, the line current ILO is kept constant at the line voltage UO having the line resistance RL for the telephone line 3 in question.

As mentioned above, the loudspeaker amplifier 5 is powered via the line 3 with the aid of a reservoir capacitor 6, in accordance with the invention. For its power supply the amplifier 5 has first and second connections 19 and 20, which are respectively connected to the line connection a and one pole of the reservoir capacitor 6, which has its other pole connected to the line connection a. The second connection 20 of the amplifier 5 is connected via a controllable current generator 22 to the resistor R1 and to the connection 21 on the speech circuit 13. A control input 23 on the current generator 22 is connected to a voltage sensing control circuit 24, which is connected across the resistor R1 and senses the voltage across it. The power supply to the amplifier 5 takes place in the following way. The incoming speech signal S is amplified in the pre-amplifier 8, which sends the currents I2 and I3 to the amplifier 5, as described above. The amplifier 5 amplifies its incoming signal and sends the signal S1 to the loudspeaker 4, during which the amplifier sends relatively large power to the loudspeaker 4. A part of the power to the amplifier is provided by the reservoir capacitor 6, which is thus discharged. When the speech signal S ceases, the power consumption of the amplifier 5 is heavily reduced to idling power. The reservoir capacitor 6 is now charged with a current I5 through the current generator 22. The voltage sensing circuit 24 senses the voltage across the resistor R1 and limits the magnitude of the current I5 with the aid of the current generator 22. During charging of the reservor capacitor 6, the speech circuit sends the current I6, where I6+I5=I4, and by limiting the current I5 the current I4 can be maintained at its constant value by the amplifier means 16. The amplitude of the incoming speech signal S varies heavily with time, and pulses of large power to the amplifier 5 and loudspeaker 4 are only required for short time intervals to produce speech from the speech signal S. The reservoir capacitor is charged in the intervals between these power pulses to a voltage, which is the line voltage UO less a small voltage drop I4×R1 across the resistor R1.

The speech circuit 13 with its amplifier means 16 is utilized for the charging process. Telephone sets not provided with loudspeakers have a corresponding amplifier means for keeping the current I4 and line current ILO constant.

The inventive apparatus utilizes in this way existing circuits in a telephone set for supplying power to the loudspeaker amplifier. There is further afforded the advantage that the apparatus for supplying power will be very simple. In addition, there is gained the advantage, compared with the prior art, that the line current ILO is utilized for charging the reservoir capacitor solely during the charging intervals, and between these the line current ILO can be fully utilized, e.g. for speech transmission.

The voltage sensing circuit 24 is not included in an alternative embodiment of the invention. In this case the current through the current generator 22 decreases when the capacitor 6 is charged and the voltage across the generator decreases. The generator 22 may also be connected in parallel with an impedance Z, as indicated by dashed lines in FIG. 3. In a further embodiment the capacitor 6 is charged solely through the impedance Z, a more simplified apparatus then being obtained, which does not have the generator 22. In this case the impedance Z must have a sufficiently large value in order to limit the current I5, so that the speech circuit 13 is capable of maintaining the current I4 at its constant value. This limitation of the current I5 can result in a relatively slow charge to the capacitor 6.

We claim:

1. Apparatus in a loudspeaker telephone set for supplying power to an amplifier connected to the loudspeaker, said telephone set being DC fed by a line current via its subscriber line and provided with a speech circuit having electronic semiconductor circuits, the receiver and microphone of the telephone set being connected to the speech circuit, which also has a voltage sensing circuit connected to the subscriber line for sensing a line voltage across it, as well as an amplifier means connected via a first impedance to the subscriber line said amplifier means maintaining a current through the first impedance at a constant value responsive to the line voltage, characterized in that the loudspeaker amplifier (5) is connected to a reservoir capacitor (6) which can supply the amplifier (5) with power, and in that the reservoir capacitor (6) is connected to the first impedance (R1) in the amplifier means (16, 17) of the speech circuit (13), the constant current (I4) through said first impedance (R1) being the sum of a current (I6) through the amplifier means (16, 17) of the speech circuit (13) and a current (I5) through the reservoir capacitor (6) and the loudspeaker amplifier (5).

2. Apparatus as claimed in claim 1, characterized in that the reservoir capacitor (6) is connected to the first impedance (R1) via a second impedance (Z).

3. Apparatus as claimed in claim 1, characterized in that the reservoir capacitor (6) is connected to the first impedance (R1) via a current generator (22).

4. An apparatus as claimed in claim 3, characterized in that said current generator (22) is controllable and is connected via a control input (23) to a control circuit (24), which is connected to the first impedance (R1) and senses the constant current (I4) through the first impedance (R1).

5. Apparatus as claimed in claim 2, characterized in that the reservoir capacitor is connected to the first impedance via a current generator.

* * * * *